(12) United States Patent
Saito (10) Patent No.: US 9,774,756 B2
(45) Date of Patent: *Sep. 26, 2017

(54) CONTROL SERVER AND IMAGE PROCESSING APPARATUS

(71) Applicant: BROTHER KOGYO KABUSHIKI KAISHA, Nagoya-shi, Aichi-ken (JP)

(72) Inventor: Ken Saito, Tokoname (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,715

(22) Filed: Oct. 20, 2016

(65) Prior Publication Data

US 2017/0041499 A1 Feb. 9, 2017

Related U.S. Application Data

(63) Continuation of application No. 14/867,629, filed on Sep. 28, 2015, now Pat. No. 9,479,655.

(30) Foreign Application Priority Data

Sep. 30, 2014 (JP) .................................. 2014-200859

(51) Int. Cl.
*G06F 3/12* (2006.01)
*H04N 1/327* (2006.01)
(Continued)

(52) U.S. Cl.
CPC ....... *H04N 1/32793* (2013.01); *G06F 3/1222* (2013.01); *G06F 3/1238* (2013.01);
(Continued)

(58) Field of Classification Search
None
See application file for complete search history.

(56) References Cited

U.S. PATENT DOCUMENTS 8,867,069 B2 10/2014 Kimura
9,041,968 B2 5/2015 Kimura
(Continued)

FOREIGN PATENT DOCUMENTS

JP 2013-109730 A 6/2013

*Primary Examiner* — Dung Tran
(74) *Attorney, Agent, or Firm* — Merchant & Gould P.C.

(57) ABSTRACT

A control server is configured to: receive, through a communication interface, a guidance image data request and specific information which are transmitted from an image processing apparatus, the guidance image data request being a request for guidance image data representing a guidance image of an acquiring procedure for acquiring authentication information required for receiving service provided by a service providing server connected to the image processing apparatus through the network; determining location information representing a location of data to be accessed in the acquiring procedure, based on the specific information transmitted from the image processing apparatus; generating the guidance image data representing the guidance image including the location information determined by the location information determining processing, when the guidance image data request is received from the image processing apparatus; and transmitting the guidance image data to the image processing apparatus through the communication interface.

12 Claims, 7 Drawing Sheets

(51) Int. Cl.
*H04N 1/00* (2006.01)
*H04N 1/44* (2006.01)
*H04N 1/32* (2006.01)

(52) U.S. Cl.
CPC .......... *G06F 3/1287* (2013.01); *G06F 3/1288* (2013.01); *G06F 3/1295* (2013.01); *H04N 1/00244* (2013.01); *H04N 1/00344* (2013.01); *H04N 1/32122* (2013.01); *H04N 1/32791* (2013.01); *H04N 1/4406* (2013.01); *H04N 1/4433* (2013.01); *H04N 2201/0039* (2013.01); *H04N 2201/0094* (2013.01); *H04N 2201/3233* (2013.01); *H04N 2201/3246* (2013.01)

(56) References Cited

U.S. PATENT DOCUMENTS

| | | |
|---|---|---|
| 9,141,898 B2 | 9/2015 | Yamamoto |
| 2009/0063567 A1 | 3/2009 | Matsunaga |
| 2013/0044345 A1 | 2/2013 | Sakai |
| 2013/0135640 A1 | 5/2013 | Nagasaki |

OK SELECTION INFORMATION

- INFORMATION REPRESENTING "OK" SELECTION
- REGION INFORMATION
- DESTINATION INFORMATION
- LANGUAGE INFORMATION

FIG. 6B

PRINT COMMAND

- ACQUISITION DESTINATION URL
- MODEL INFORMATION
- TEMPLATE FILE INFORMATION
- INDIVIDUAL URL
http://device.maker.com/?mdl=mdl738&c=JP&lng=jp ML    SL1   SL2   SL3

FIG. 6C

GUIDANCE IMAGE DATA REQUEST

- MODEL INFORMATION
- TEMPLATE FILE INFORMATION
- INDIVIDUAL URL
http://device.maker.com/?mdl=mdl738&c=JP&lng=jp ML    SL1   SL2   SL3

FIG. 7

CONTROL SERVER AND IMAGE PROCESSING APPARATUS

CROSS-REFERENCE TO RELATED APPLICATION

This application is a continuation of U.S. patent application Ser. No. 14/867,629, filed Sep. 28, 2015, which further claims priorities from Japanese Patent Application No. 2014-200859 filed on Sep. 30, 2014, the entire subject matter of both of which are incorporated herein by reference.

TECHNICAL FIELD

The present invention relates to a configuration for enabling an image processing apparatus to receive service provided from a service providing server through a network.

BACKGROUND

In order for an image processing apparatus such as a multi function apparatus to access a service providing server which provides a service through a network, sometimes, it is required to go through a predetermined procedure in advance. There has been disclosed an authentication information acquiring procedure which is performed in advance in order for a multi function apparatus to upload scan data to a service providing server.

SUMMARY

This pre-procedure may be difficult for users who lack knowledge. As a result, for example, some users may give up on using the service providing server.

The present disclosure has been made in view of the above circumstances, and one of objects of the present disclosure is to provide a configuration capable of reducing a burden of a user for using a service providing server by use of an image processing apparatus. According to an illustrative embodiment of the present disclosure, there is provided a control server including: a communication interface configured to be connectable with a network and establishes communication with an image processing apparatus through the network, the image processing apparatus being configured to perform one or more types of image processing including a printing process; a processor; and memory storing computer readable instructions that, when executed by the processor, causing the control server to perform: receiving processing of receiving, through the communication interface, a guidance image data request and specific information which are transmitted from the image processing apparatus based on operations of a user, the guidance image data request being a request for guidance image data representing a guidance image of an acquiring procedure for acquiring authentication information required for receiving service provided by a service providing server connected to the image processing apparatus through the network; location information determining processing of determining location information representing a location of data to be accessed in the acquiring procedure, based on the specific information transmitted from the image processing apparatus; image generating processing of generating the guidance image data representing the guidance image including the location information determined by the location information determining processing, when the guidance image data request is received from the image processing apparatus; and image transmitting processing of transmitting the guidance image data to the image processing apparatus through the communication interface.

According to another illustrative embodiment of the present disclosure, there is provided an image processing apparatus including: a printer unit configured to print an image on a sheet; a user interface configured to receive a command input by a user; a communication interface that is connected to a network; a processor; and memory storing computer readable instructions that, when executed by the processor, causing the image processing apparatus to perform: transmitting processing of transmitting, to a control server through the communication interface in response to the command input through the user interface by the user, a guidance image data request and specific information, the guidance image data request being a request for guidance image data representing a guidance image of an acquiring procedure for acquiring authentication information required for receiving service provided by a service providing server connected to the image processing apparatus through the network; receiving processing of receiving, from the control server through the communication interface, guidance image data that is generated by the control server based on the guidance image data request and the specific information, the guidance image data representing the guidance image including location information representing a location of data to be accessed in the acquiring procedure; and printing processing of printing, on the sheet by the printer unit, the guidance image included in the guidance image data received in the receiving processing.

According to still another illustrative embodiment of the present disclosure, there is provided a non-transitory computer readable recording medium storing computer readable instructions for a control server that is provided with a communication interface and a processor, wherein the instructions, when executed by the processor, causing the control server to perform: receiving processing of receiving, through the communication interface, a guidance image data request and specific information which are transmitted from an image processing apparatus based on operations of a user, the guidance image data request being a request for guidance image data representing a guidance image of an acquiring procedure for acquiring authentication information required for receiving service provided by a service providing server connected to the image processing apparatus through the network; location information determining processing of determining location information representing a location of data to be accessed in the acquiring procedure, based on the specific information transmitted from the image processing apparatus; image generating processing of generating the guidance image data representing the guidance image including the location information determined by the location information determining processing, when the guidance image data request is received from the image processing apparatus; and image transmitting processing of transmitting the guidance image data to the image processing apparatus through the communication interface.

BRIEF DESCRIPTION OF THE DRAWINGS

In the accompanying drawings:

FIG. 2 is a view illustrating an example of an account information table AT;

DETAILED DESCRIPTION

Figure 1:
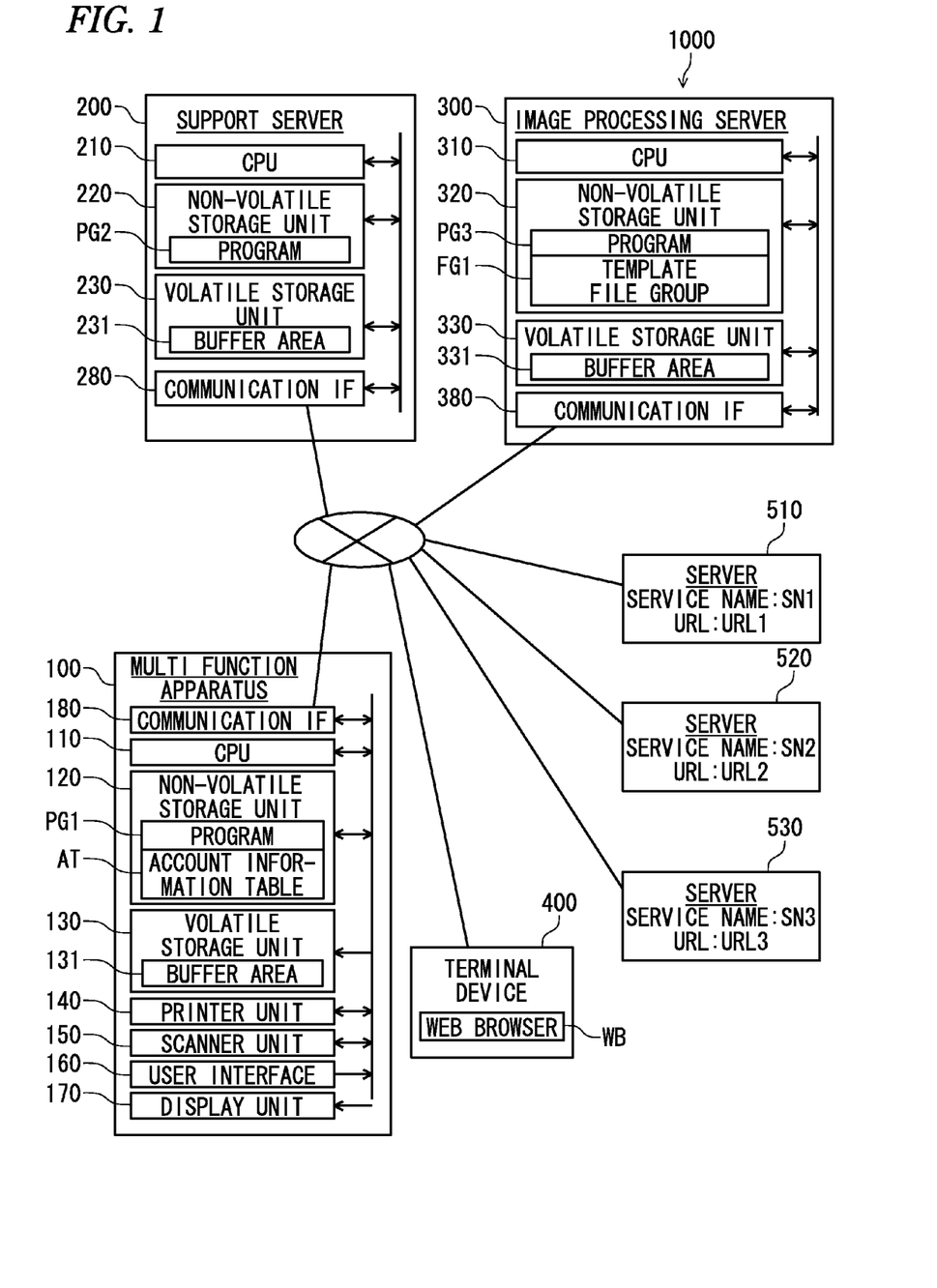
FIG. 1 is a block diagram illustrating a configuration of a system 1000 according to an embodiment of the present disclosure.

A mode for carrying out the present disclosure will be described based on an embodiment. FIG. 1 is a block diagram illustrating a configuration of a system 1000 as an embodiment of the present disclosure. The system 1000 includes a multi function apparatus 100, a support server 200, an image processing server 300, a terminal device 400, and a plurality of WEB servers 510 to 530. These apparatuses and device 100, 200, 300, 400, and 510 to 530 are individually configured and are connected to the Internet 80. As a result, the apparatuses and device 100, 200, 300, 400, and 510 to 530 can establish communication with one another through the Internet 80.

The WEB servers 510 to 530 are servers for providing WEB services capable of storing image data. Each WEB server is, for example, a cloud server which includes a plurality of computers connected to one another such that communication is possible, and a plurality of storage devices. Examples of WEB services include a storage service to store data received from clients (for example, the multi function apparatus 100 and the terminal device 400 (not shown)), and a social networking service to perform storing and disclosing of data received from clients. Specific examples of WEB services include publicly known services such as Evernote (registered trademark of Evernote Corporation), Google Drive(registered trademark of Google.Inc.), PICASA (registered trademark of Lifescape, Inc.), OneDrive (registered trademark of Microsoft Corporation), Dropbox (registered trademark of Dropbox, Inc.), Box (registered trademark of Box Inc.), Flickr (registered trademark of Yahoo Inc.), and Facebook (registered trademark of Facebook, Inc.).

The WEB services which are provided by the WEB servers 510, 520, and 530 are named "SN1", ", SN2", and "SN3", respectively. Providers of the WEB services "SN1", ", SN2", and "SN3", which are provided by the WEB servers 510 to 530 are different from one another. The providers of the WEB services "SN1", ", SN2", and "SN3", are also different from the vendor of the multi function apparatus 100. In order to use the WEB services "SN1", ", SN2", and "SN3", it is required to access different URLs (URL is an abbreviation for Uniform Resource Locator). The URLs which users needs to access in order to use the WEB services "SN1", "SN2", and "SN3", are referred to as "URL1", ", URL2", and "URL3", respectively. It can be said that each URL is location information representing the location of data such as a WEB page on the Internet 80.

The multi function apparatus 100 is an image processing apparatus capable of performing a plurality of types of image processing including a printing process and a scanning process. The multi function apparatus 100 includes a CPU 110, a non-volatile storage unit 120 such as a hard disk or an EEPROM, a volatile storage unit 130 such as a RAM, a printer unit 140 for printing images in a predetermined system (such as a laser system or an inkjet system), a scanner unit 150 for optically reading objects (such as paper documents), thereby acquiring scan data, a user interface 160 such as a touch panel and buttons, a display unit 170 such as a liquid crystal panel superimposed on the touch panel, and a communication interface (IF) 180.

Examples of the communication IF 180 include interfaces based on Ethernet standards.

The non-volatile storage unit 120 stores a computer program PG1 and an account information table AT to be described below. In the non-volatile storage unit 120, there is a buffer area 131 for temporarily storing a variety of intermediate data which are generated when the CPU 110 performs processing.

The computer program PG1 is stored in advance in the non-volatile storage unit 120 during shipment of the multi function apparatus 100. Alternatively, the computer program PG1 may be downloaded from a server connected to the multi function apparatus 100 through the Internet 80, or may be installed from a CD-ROM, a DVD-ROM, or the like.

The CPU 110 executes the computer program PG1, thereby serving as a controller of the multi function apparatus 100. Specifically, the CPU 110 controls the printer unit 140 or the scanner unit 150, thereby performing printing or scanning. The CPU 110 is an example of a processor.

Further, the CPU 110 can implement cloud connection functions by executing the computer program PG1. Specifically, the CPU 110 accesses the support server 200, thereby operating according to commands received from the support server 200. Hereby, the CPU 110 can implement the cloud connection functions in cooperation with the support server 200 and the image processing server 300. For example, the cloud connection functions include a "Scan to Cloud" function and a "Download Print" function. The "Scan to Cloud" function is a function of the multi function apparatus 100 for generating scan data by use of the scanner unit 150 and transmitting the generated scan data to a predetermined WEB server. The "Download Print" function is a function of the multi function apparatus 100 for downloading image data representing an image from a predetermined WEB server and printing that image by use of the printer unit 140. A predetermined WEB server is a WEB server (for example, the WEB server 510) providing a WEB service (for example, the WEB service "SN1") designated by a user.

Figure 2:
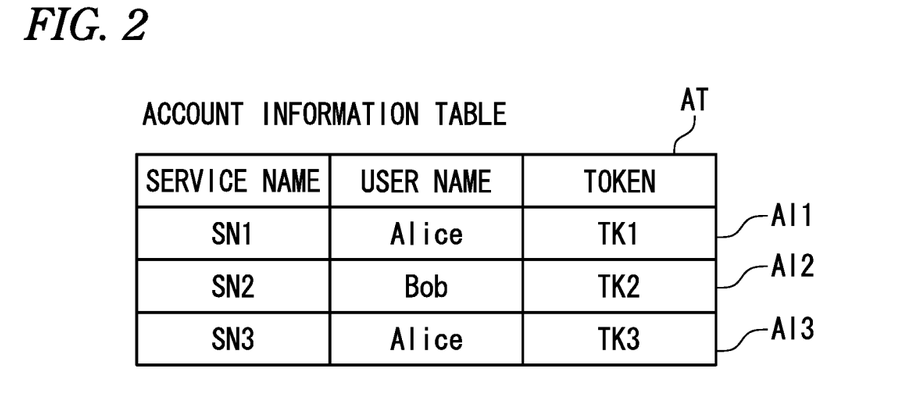

FIG. 2 is a view illustrating an example of the account information table AT. For each account of the WEB services "SN1", ", SN2", and "SN3", an account information item AI is registered in the account information table AT. For example, in the example of FIG. 2, the account information table AT includes three registered account information items AI1 to AI3. Each account information item AI includes a WEB service name, a user name, and a token. A user name (for example, "Alice") is a character string which is registered by a user. A token (for example, a token TK1) is authentication information necessary for receiving service provided by a WEB server (for example, the WEB server 510) providing a WEB service, that is, authentication information necessary for the multi function apparatus 100 to access a WEB server. One token can be used in common in two cloud connection functions. For example, the token TK1, for the WEB service "SN1", can be used in common in the "Scan to Cloud" function and "Download Print" function. In the "Scan to Cloud" function, the token TK1, can be used to access the WEB server 510 in order to upload scan data to the WEB server 510; whereas in the "Download Print" function, the token TK1, can be used to access the WEB server 510, in order to download image data, representing an image to be printed, from the WEB server 510.

The support server 200 (FIG. 1) is a server which is provided by the vendor of the multi function apparatus 100. The support server 200 includes a CPU 210 serving as a controller of the support server 200, a non-volatile storage unit 220 such as a hard disk drive, a volatile storage unit 230 such as a RAM, and a communication IF 280 for connection with the Internet 80.

The non-volatile storage unit 220 stores a computer program PG2. In the non-volatile storage unit 220, there is a buffer area 231 for temporarily storing a variety of intermediate data which are generated when the CPU 210 performs processing.

The CPU 210 executes the computer program PG2, thereby performing a process related to the above described cloud connection functions in cooperation with the multi function apparatus 100 and the image processing server 300. Specifically, the CPU 210 transmits various operation commands to the multi function apparatus 100 in response to access from the multi function apparatus 100, thereby controlling the multi function apparatus 100. The CPU 210 can make the multi function apparatus 100 implement the cloud connection functions. The image processing server 300 (FIG. 1) is a server which is provided by the vendor of the image processing server 300. The image processing server 300 includes a CPU 310 serving as a controller of the image processing server 300, a non-volatile storage unit 320 such as a hard disk drive, a volatile storage unit 330 such as a RAM, and a communication IF 380 for connection with the Internet 80.

The non-volatile storage unit 320 stores a computer program PG3 and a template file group FG1. The volatile storage unit 330 is used as a buffer area 331 for temporarily storing a variety of intermediate data which are generated when the CPU 310 performs processing. The template file group FG1 includes a plurality of template files. Each template file is a file of data on a template image which is used as a template for generating guidance image data to be described below.

The CPU 310 performs a process related to the cloud connection functions in cooperation with the multi function apparatus 100 and the support server 200 by executing the computer program PG3. Specifically, the CPU 310 performs a process of generating guidance image data (to be described below) by use of a template file.

Each of the computer programs PG2 and PG3 and the template file group FG1 may be uploaded from a computer of the vendor connected through the Internet 80, or may be installed from a CD-ROM, a DVD-ROM, or the like.

The terminal device 400 is a computer which a user of the multi function apparatus 100 uses, and is, for example, a personal computer or a smart phone. On the terminal device 400, a publicly known browser program (not shown) is installed so as to function as a WEB browser WB.

Before using the cloud connection functions by use of the multi function apparatus 100, the user needs to acquire a token for accessing a desired WEB server and receiving service provided by the corresponding WEB server. Further, the user may be required to register an account information item AI (see FIG. 2) including the corresponding token, in the multi function apparatus 100. A procedure of acquiring a token and registering an account information item AI in the multi function apparatus 100 (hereinafter, also referred to as an account registering procedure) will be described. An account registering procedure for accessing the WEB server 510 will be described as an example.

First, the user operates the WEB browser WB of the terminal device 400, thereby accessing the WEB server 510 and acquiring a user account of the WEB service "SN1", which is provided by the WEB server 510. During the account acquisition, a user ID and a password for using the WEB service "SN1", are issued from the WEB server 510 to the user. This process is a process which is generally performed for using a WEB service through the WEB browser WB of the terminal device 400.

Figure 3A:
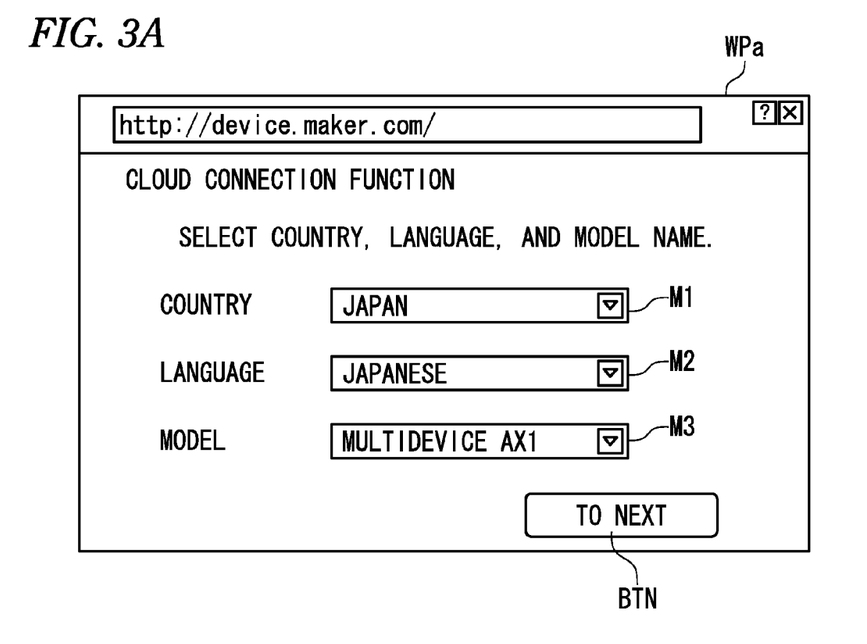
FIGS. 3A and 3B are views illustrating an example of a WEB page group for an account registering procedure.
Figure 3B:
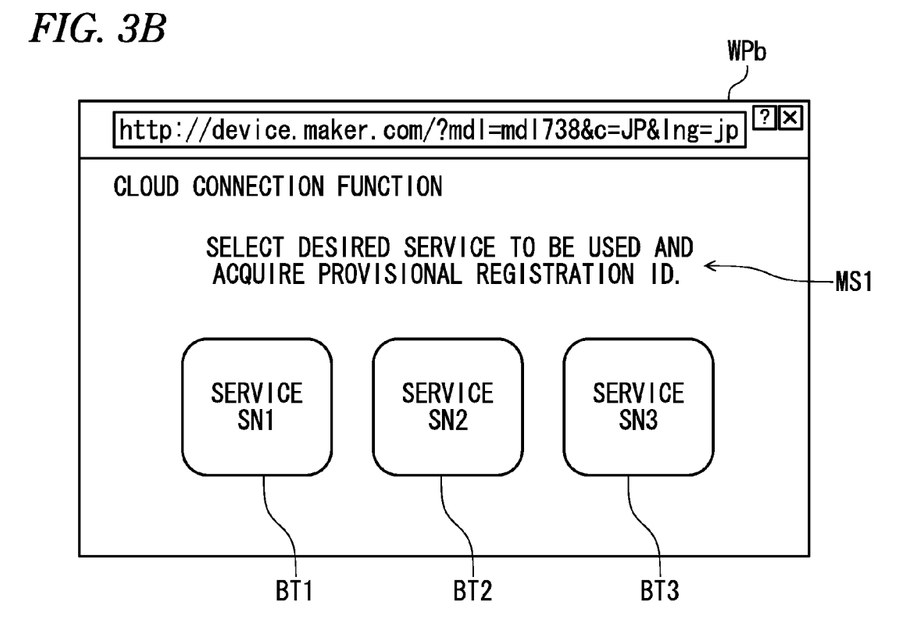

Subsequently, the user accesses a WEB page for an account registering procedure by use of the WEB browser WB of the terminal device 400. FIGS. 3A and 3B are views illustrating an example of a WEB page group for the account registering procedure. The WEB page group for the account registering procedure is provided by a server which is operated by the vendor of the multi function apparatus 100. In the present embodiment, the WEB page group is provided by the support server 200 of FIG. 1.

For example, the user accesses a top page WPa of the WEB page group for the account registering procedure. An example of the top page WPa is shown in FIG. 3A. The top page WPa includes three pull-down menus M1 to M3 and a button BTN. The pull-down menus M1 to M3 are menus for inputting country information representing a country where the user lives, language information representing the type of language which the user uses, and model information representing the model of the multi function apparatus which the user will use, respectively. The user inputs those information items by operating the pull-down menus M1 to M3, and then presses the button BTN. The country information representing the country where the user lives is information representing a region where the user uses the multi function apparatus, and thus is also referred to as region information.

If the button BTN is pressed, a WEB page WPb selected from a plurality of WEB pages according to the input region information, the input language information, and the input model information is displayed on the terminal device 400. An example of an individual WEB page WPb is shown in FIG. 3B. The WEB pages WPb differ depending on region information, language information, and model information, and thus are also referred to as individual WEB pages. That is, it is possible to access each of the plurality of individual WEB pages through the top page WPa. An individual WEB page WPb includes a plurality of buttons BT1 to BT3 representing a plurality of WEB service options, and a message MS1 prompting the user to select a WEB service to be used. Since the specifications of multi function apparatuses differ depending on destinations and models, the types and numbers of WEB services available in cloud connection functions may differ depending on the destinations and models of multi function apparatuses to be used by users. For this reason, the numbers of buttons which are included in the individual WEB pages WPb can differ depending on the pages. The message MS1 is described in characters of the language represented by the language information input on the top page WPa.

The user selects any one of the plurality of buttons BT1 to BT3 included in the individual WEB page WPb, thereby selecting a desired WEB service to be used. Here, on the assumption that the user selects the WEB service "SN1" which is provided by the WEB server 510, a description will be made.

If the WEB service "SN1", is selected, the WEB browser WB of the terminal device 400 acquires a specific URL for accessing a token distributing service which is provided by the WEB server 510, from the support server 200 providing the WEB page WPb. The WEB browser WB of the terminal device 400 designates the specific URL, thereby accessing the WEB server 510, and transmits the registered user ID and the registered password to the WEB server 510 in response to an operation of the user.

The WEB server 510 specifies a user account corresponding to the user ID and the password received from the terminal device 400. Subsequently, the WEB server 510 generates a token corresponding to the specified user account, and transmits that token to the support server 200. The WEB server 510 recognizes in advance that if a user ID and a password having been registered are received through access designating a specific URL, it should transmit a generated token to the support server 200.

If the support server 200 receives the token, it saves the token in the non-volatile storage unit 220. Subsequently, the support server 200 generates a provisional registration ID in association with the token, and transmits the corresponding provisional registration ID to the terminal device 400. The WEB browser WB of the terminal device 400 displays the received provisional registration ID.

Subsequently, the user makes the multi function apparatus 100 and the support server 200 perform an account registering procedure, thereby registering an account information item AI. In brief, the user inputs the name ("SN1") of the selected WEB service, the name (for example, "Alice") of the user, and the provisional registration ID displayed on the terminal device 400, to the multi function apparatus 100, by operating the user interface 160 of the multi function apparatus 100. If the multi function apparatus 100 receives those input information items, it transmits the input provisional registration ID to the support server 200. In response to this, the support server 200 transmits the token (for example, the token TK1) associated with the provisional registration ID, to the multi function apparatus 100. After transmitting the token to the multi function apparatus 100, the support server 200 deletes the corresponding token from the non-volatile storage unit 220.

The multi function apparatus 100 registers an account information item AI including the received token (for example, the token TK1), the name ("SN1") of the selected WEB service, and the name (for example, "Alice") of the user, in the account information table AT of the volatile storage unit 130 (see FIG. 2).

Although an example in which the account information item AI of the WEB service "SN1", which is provided by the WEB server 510 is registered in the multi function apparatus 100 has been described above, with respect to the other WEB services SN2, and SN3, it is possible to register similar account information items AI in the multi function apparatus 100 by performing the same process.

As can be understood from the above description, the procedure which the user should perform in order to register the account information item AI does not consist only of acquiring the user account of the WEB service "SN1". The procedure which the user should perform includes the step of accessing the top page WPa and the individual WEB page WPb which are provided by the support server 200, and acquiring the provisional registration ID, by use of the terminal device 400, and the step of inputting the corresponding provisional registration ID to the multi function apparatus 100. This procedure may be unfamiliar to the user and be complicated for the user. As a result, there is a possibility that the user would give up on using the cloud connection functions.

In the system 1000 of the present embodiment, the multi function apparatus 100, the support server 200, and the image processing server 300 perform a guidance image printing process of printing an image of a guidance of the account registering procedure, as a portion of the process related to the cloud connection functions, in cooperation with one another. As a result, a burden of the user to perform the account registering procedure is reduced. Hereinafter, the process related to the cloud connection functions will be described with a focus on the guidance image printing process.

Figure 4:
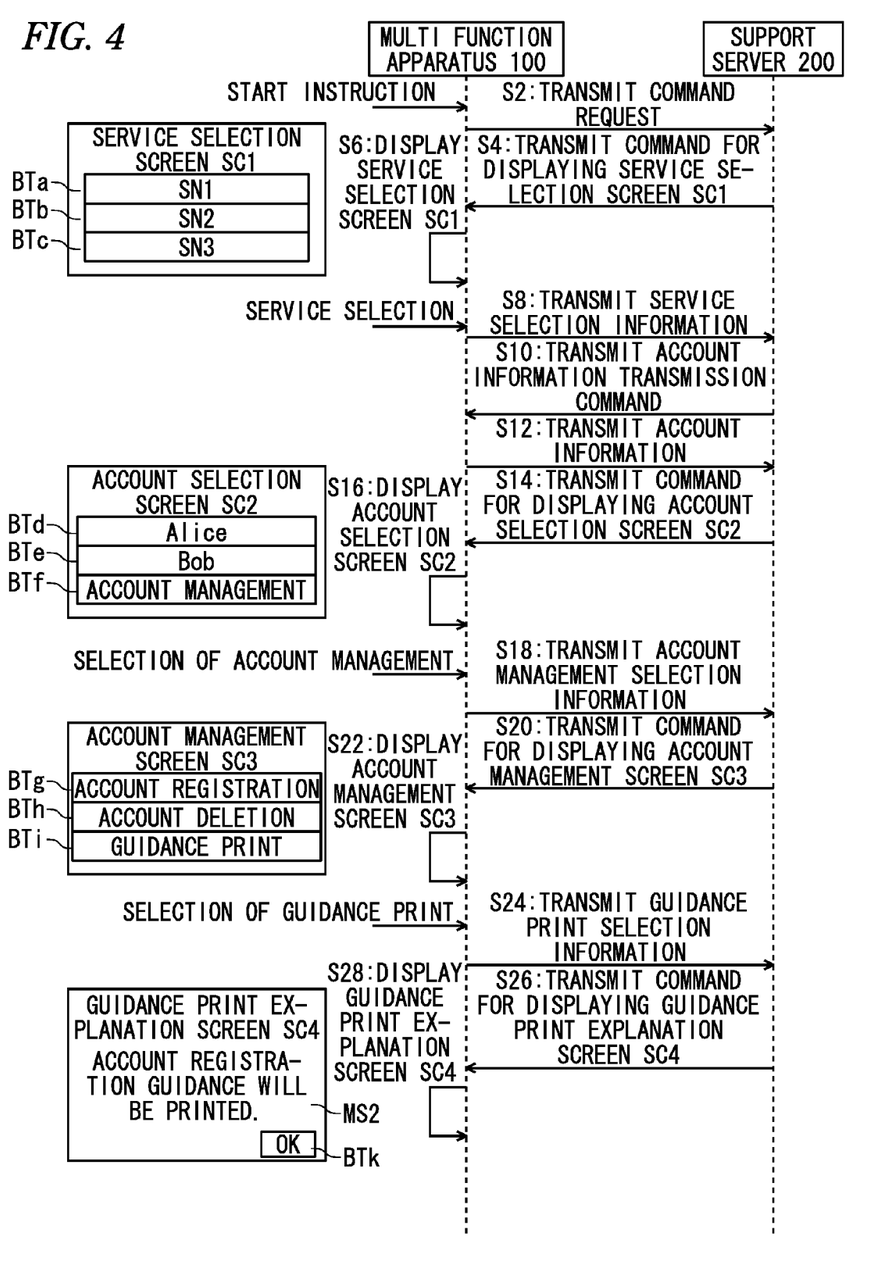
FIG. 4 is a flow chart illustrating a process related to cloud connection functions.
Figure 5:
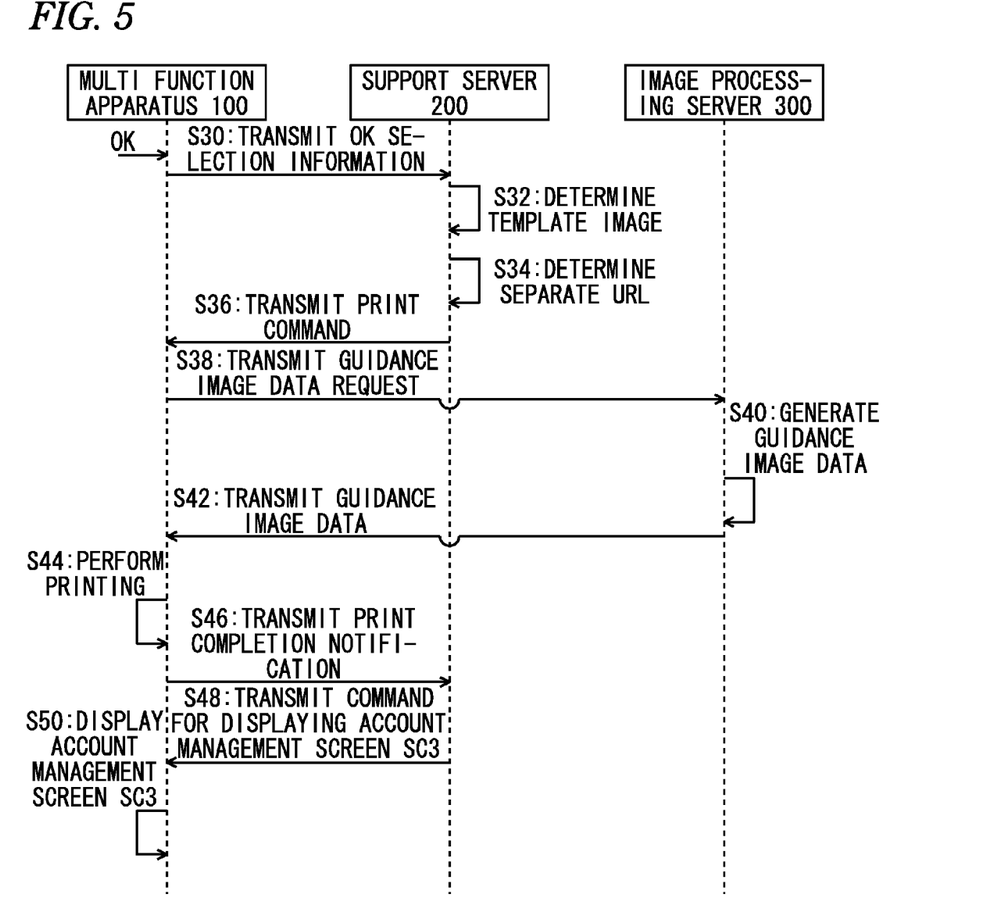
FIG. 5 is a flow chart illustrating the process related to the cloud connection functions.

FIGS. 4 and 5 are flow charts illustrating the process related to the cloud connection functions. This process is started if the multi function apparatus 100 receives a cloud connection function start instruction from the user. Here, on the assumption that the multi function apparatus receives an instruction for starting the "Scan to Cloud" function which is one of the cloud connection functions, a description will be made.

The process of FIGS. 4 and 5 involves communication between the multi function apparatus 100 and the support server 200 and communication between the multi function apparatus 100 and the image processing server 300. This communication is performed by use of a HyperText Transfer Protocol (HTTP). In the process of FIGS. 4 and 5, data (for example, various notifications, information, and requests) which are transmitted from the multi function apparatus 100 to the server 200 or 300 are transmitted as HTTP requests.

Data (for example, various operation commands and data) which are transmitted from the server 200 or 300 to the multi function apparatus 100 are transmitted as HTTP responses to previous HTTP requests received from the multi function apparatus 100.

In STEP S2, the CPU 110 of the multi function apparatus 100 transmits a first command request to the support server 200.

If the support server 200 receives the first command request, in STEP S4, the CPU 210 transmits a command for displaying a service selection screen SC1, to the multi function apparatus 100. A display command includes display screen data representing a display object screen (for example, any one of screens SC1, to SC4, (FIG. 4) to be described below). The display screen data is described, for example, in an Extensible Markup Language (XML).

In STEP S6 of FIG. 4, in response to the command for displaying the service selection screen SC1, the CPU 110 displays the screen SC1, on the display unit 170. Specifically, in a case where a received operation command is a display command, the CPU 110 uses display screen data included in the display command to display a screen, represented by the display screen data, on the display unit 170.

The service selection screen SC1, of FIG. 4 includes a plurality of buttons BTa to BTc representing the plurality of selectable WEB services "SN1", ", SN2", and "SN3". If the user selects a button representing a desired WEB service as a scan data transmission destination, in STEP S8, the CPU 110 transmits service selection information representing the selection result, to the support server 200.

When the support server 200 receives the service selection information, in STEP S10, the CPU 210 transmits a command for transmission of account information items AI to the support server 200, to the multi function apparatus 100. The command for transmission to the support server 200 is a type of operation command which is transmitted from the support server 200 to the multi function apparatus 100.

When the multi function apparatus 100 receives the command for transmission of account information items AI, in response to the received transmission command, in STEP S12, the CPU 110 transmits all account information items AI registered in the account information table AT (FIG. 2), to the support server 200.

When the support server 200 receives the account information items AI, in STEP S14, the CPU 210 transmits a command for displaying an account selection screen SC2, to the multi function apparatus 100. Specifically, the CPU 210 specifies the selected WEB service based on the service selection information received in STEP S8. Subsequently, the CPU 210 extracts user names associated with the selected WEB service, from all account information items AI received in STEP S12. For example, in a case where the selected WEB service is the WEB service "SN2", two user names "Alice" and "Bob" are extracted from the account information items AI1 to AI3 of FIG. 2. Thereafter, the CPU 210 generates display screen data representing an account selection screen SC2, on which the extracted user names are selectable. Subsequently, the CPU 210 transmits a display command including the corresponding display screen data.

When the multi function apparatus 100 receives the command for displaying an account selection screen SC2, in response to this command, in STEP S16, the CPU 110 displays the screen SC2, on the display unit 170. In the example of FIG. 4, the account selection screen SC2 includes two buttons BTd and BTe representing the user names "Alice" and "Bob", and a button BTf representing "ACCOUNT MANAGEMENT".

In a case where the account information item AI of the user has been already registered, the user selects a button representing the user name of the corresponding account information item AI, on the account selection screen SC2. In this case, a WEB server is accessed by use of the account information item AI of the selected user name, and the "Scan to Cloud" function to upload scan data to the corresponding WEB server is performed (not shown). In some cases such as a case of using the cloud connection functions for the first time, there is no user's account registered. In this case, the user selects the button BTf representing "ACCOUNT MANAGEMENT". Here, on the assumption that the user selects the button BTf representing "ACCOUNT MANAGEMENT", the subsequent description will be made.

When the user selects the button BTf representing "ACCOUNT MANAGEMENT", in STEP S18, the CPU 110 transmits account management selection information representing that account management has been selected, to the support server 200.

When the support server 200 receives the account management selection information, in STEP S20, the CPU 210 transmits a command for displaying an account management screen SC3,, to the multi function apparatus 100. When the multi function apparatus 100 receives the command for displaying the screen SC3, in response to this command, in STEP S22, the CPU 110 displays the screen SC3, on the display unit 170. The account management screen SC3, of FIG. 4 includes a button BTg representing "ACCOUNT REGISTRATION", a button BTh representing "ACCOUNT DELETION", and a button BTi representing "GUIDANCE PRINT".

When the button BTg representing "ACCOUNT REGISTRATION" is selected, a process for allowing the user to perform the above described procedure of inputting a provisional registration ID to the multi function apparatus 100 in order to register an account information item AI. Although its details are omitted, in response to a display command of the support server 200, the CPU 110 of the multi function apparatus 100 displays a UI screen for inputting a WEB service name (for example, "SN1"), a user name (for example, "Alice"), and a provisional registration ID, on the display unit 170. Subsequently, the CPU 110 acquires a token associated with the provisional registration ID, from the support server 200, and registers an account information item AI including the corresponding token, in the account information table AT. If the button BTh representing "ACCOUNT DELETION" is selected, although its details are omitted, a process for deleting an account information item AI, designated by the user, from the account information table AT is performed.

In the case where the user selects the button BTi representing "GUIDANCE PRINT", the subsequent description will be made. When the user selects the button BTi representing "GUIDANCE PRINT", in STEP S24, the CPU 110 transmits guidance print selection information representing that guidance print is selected, to the support server 200.

When the support server 200 receives the guidance print selection information, in STEP S26, the CPU 210 transmits a command for displaying a guidance print explanation screen SC4, to the multi function apparatus 100. When the multi function apparatus 100 receives the command for displaying the screen SC4, in response to this command, in STEP S28, the CPU 110 displays the screen SC4, on the display unit 170. The guidance print explanation screen SC4, of FIG. 4 includes a message MS2 representing a guidance print explanation, and a button BTk representing "OK".

When the button BTk representing "OK" is selected, in STEP S30 of FIG. 5, the CPU 110 transmits OK selection information representing that "OK" has been selected, to the support server 200.

Figure 6A:
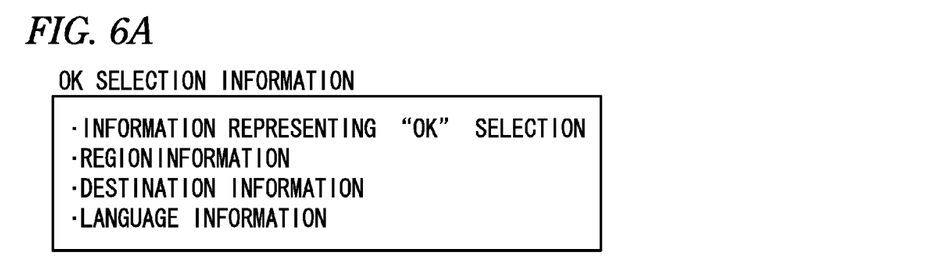
FIGS. 6A to 6C are views illustrating examples of information which is communicated with respect to printing of a guidance.
Figure 6B:
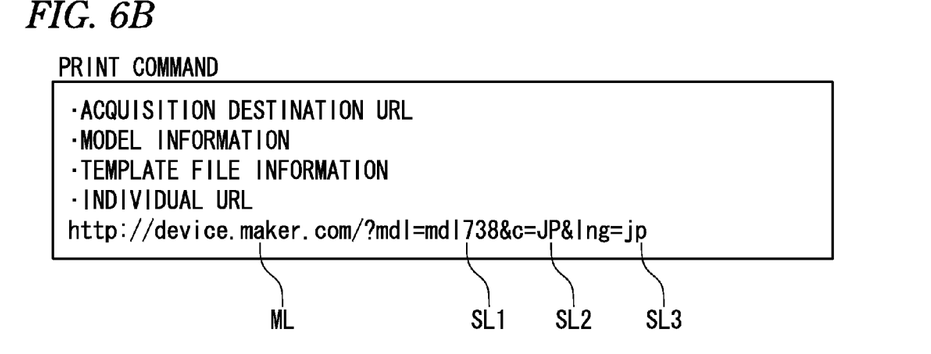
Figure 6C:
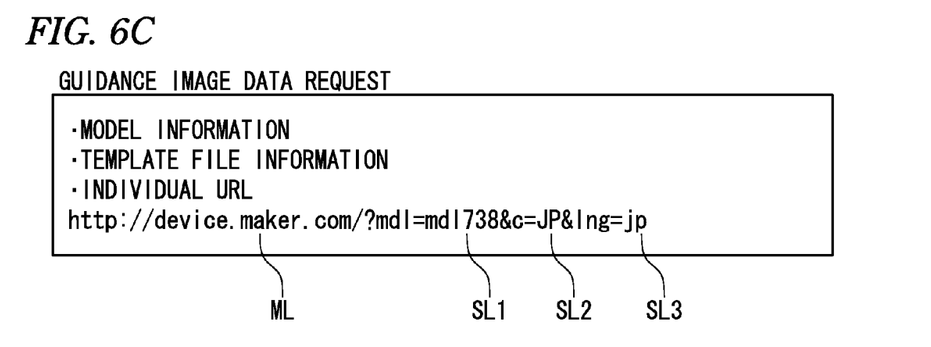

FIGS. 6A to 6C are views illustrating examples of information which is communicated with respect to guidance print. FIG. 6A shows an example of the OK selection information. The OK selection information includes not only information representing "OK" selection, but also model information representing the model of the multi function apparatus 100, region information representing the region where the user uses the multi function apparatus 100, and language information representing the type of language which is used in UI screens of the multi function apparatus 100. The model information, the region information, and the language information may be included in the header of an HTTP request.

If the support server 200 receives the OK selection information, in STEP S32, the CPU 210 determines one template file to be used, from the plurality of template files included in the template file group FG1. Languages which are used in messages (character strings) included in a plurality of template images represented by the plurality of template files are different from one another. The CPU 210 determines a template file representing a template image using a language represented by the language information included in the OK selection information, as a template file to be used. Specifically, the CPU 210 determines the name of a template file to be used. The names of each of the plurality of template files which is included in the template file group FG1 is defined so as to include a text representing the type of language which is used in messages (character strings) included in a corresponding image. For example, the name of a template file of a Japanese template image is defined as "guide-image JP", and the name of a template file of an English template image is defined as "guide-image EN". For this reason, the CPU 210 determines the name of a template file to be used by adding a text (for example, "JP" or "EN") representing the language represented by the language information to a common part (for example, "guide-image") of the names of the template files.

In STEP S34, the CPU 210 determines the URL (individual URL) of an individual WEB page WPb (FIG. 3B). As described above, in the present embodiment, the plurality of different individual WEB pages WPb depending on region information, language information, and model information is prepared. The CPU 210 determines an individual URL representing the location of an individual WEB page WPb according to the region information, the language information, and the model information included in the OK selection information.

In STEP S36, the CPU 210 transmits a print command for instructing the multi function apparatus 100 to print a guidance image, to the multi function apparatus 100. An example of the print command is shown in FIG. 6B. The print command includes an acquisition destination URL representing a guidance image data acquisition destination, the model information, template file information representing the template file name determined in STEP S32, and the individual URL determined in STEP S34. In the present embodiment, the acquisition destination URL is a URL representing the image processing server 300. In FIG. 6B, as an example of the individual URL, a URL "http://device-.maker.com/?mdl=md1738&c=JP&lng=jp" is shown. The individual URL includes a common part ML, a model display part SL1 representing the model of the multi function apparatus 100, a destination display part SL2 representing the destination of the multi function apparatus 100, and a language display part SL3 representing the language. In the example of FIG. 6B, the common part ML is "http://device.maker.com". Also, in the example of FIG. 6B, the model display part SL1, the destination display part SL2, and the language display part SL3 are "mdl=md1738", ", c=JP", and "lng=jp, respectively. Each individual URL includes specific information (specifically, model information, region information, and language information) as described above.

The multi function apparatus 100 recognizes in advance whether a print command is received, and whether it should acquire image data representing an image to be printed, based on an acquisition destination URL, and perform printing based on the acquired image data. For this reason, if the multi function apparatus 100 receives the print command, in STEP S38, the CPU 110 transmits a guidance image data request to the image processing server 300. As a destination URL of the guidance image data request, the acquisition destination URL included in the print command can be used. An example of the guidance image data request is shown in FIG. 6C. As shown in FIG. 6C, the guidance image data request includes the model information, the template file information, and the individual URL included in the print command.

When the image processing server 300 receives the guidance image data request, in STEP S40, the CPU 310 generates guidance image data representing a guidance image GI.

Figure 7:
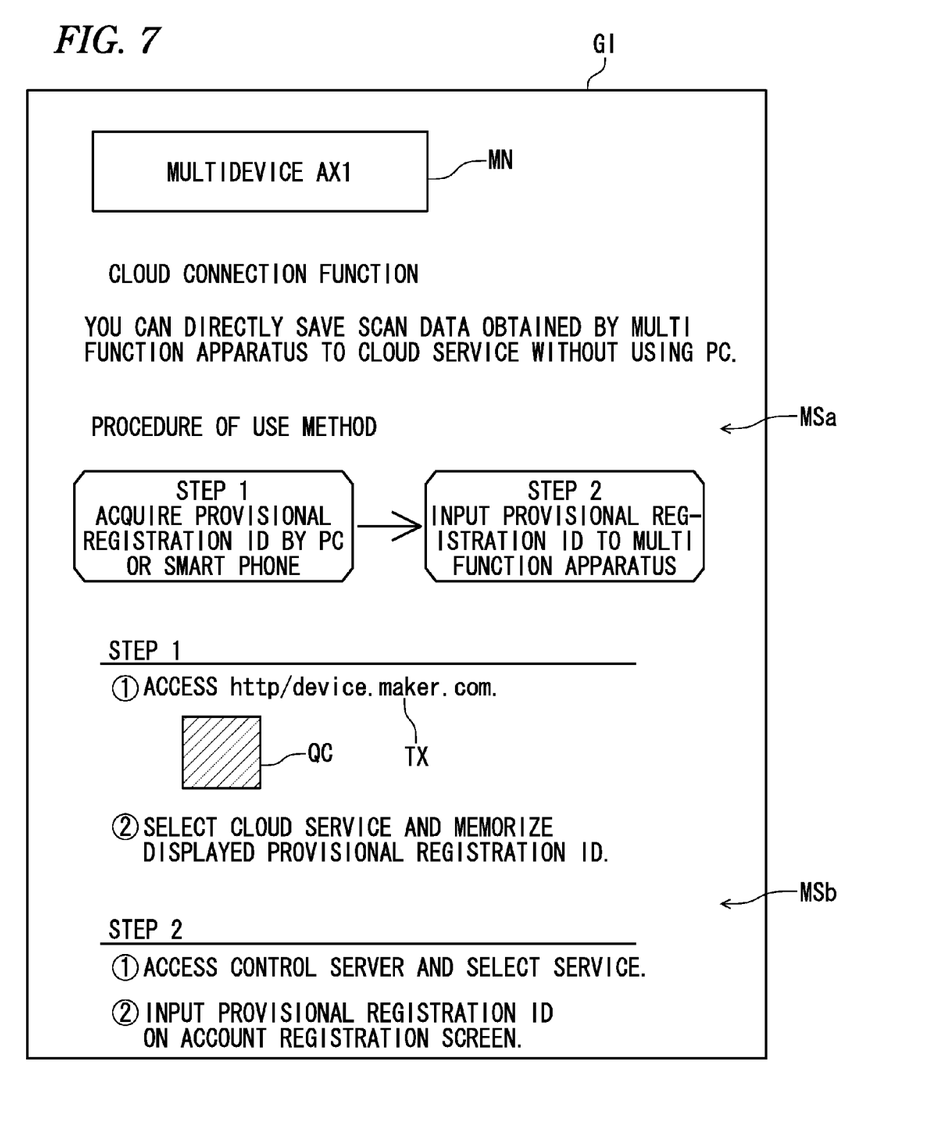
FIG. 7 is a view illustrating an example of a guidance image GI.

FIG. 7 is a view illustrating an example of the guidance image GI. The guidance image GI shows a guidance of the account registering procedure. The guidance image GI includes an image MN representing the model name of the multi function apparatus 100, an outline part MSa explaining the outline of the account registering procedure, and a detailed part MSb explaining details of the account registering procedure. The detailed part MSb includes a character string TX representing a top page URL, and a code image QC. The top page URL is location information representing the location of the top page WPa (FIG. 3A) of the WEB page group for the above described account registering procedure. This URL is common regardless of region information, language information, and model information, and thus is also referred to as a common URL. The code image QC is QR code™ representing an encoded individual URL. The common URL is the same as the common part ML ("http://device.maker.com") of the above described individual URL (for example, "http://device.maker.com/?mdl=md1738&c=JP&lng=jp"). In other words, the common URL and the individual URL have a hierarchical structure, and the individual URL is a URL in a layer lower than that of the common URL.

The CPU 310 acquires the template file represented by the template file name of the guidance image data request (FIG. 6C), from the template file group FG1 stored in the non-volatile storage unit 320, and stores the template file in the buffer area 331. The template image represented by the template file is an image which is the same as the guidance image GI of FIG. 7 except that it does not include the image MN representing the model name and the code image QC. The CPU 310 arranges the image MN representing the model name and the code image QC in the template image, thereby generating guidance image data representing the guidance image GI. The image MN representing the model name is generated based on the model information included in the guidance image data request. The code image QC is generated based on the individual URL included in the guidance image data request.

In STEP S42, the CPU 310 transmits the generated guidance image data to the multi function apparatus 100. According to the print command received in STEP S36, if the multi function apparatus 100 receives the guidance image data in STEP S44, the CPU 110 controls the printer unit 140 such that the printer unit prints the guidance image GI of FIG. 7 on a sheet based on the guidance image data.

When printing of the guidance image GI is completed, in STEP S46, the CPU 110 transmits a print completion notification to the support server 200. When the support server 200 receives the print completion notification, in STEP S48, the CPU 210 transmits a command for displaying the above described account management screen SC3, to the multi function apparatus 100. When the multi function apparatus 100 receives the corresponding display command, in STEP S50, the CPU 110 displays the account management screen SC3, (FIG. 4) on the display unit 170. As a result, the process related to the cloud connection functions returns to a state where STEP S22 of FIG. 4 has been performed.

According to the present embodiment described above, based on an operation of the user, specifically, pressing of the button BTi of the account management screen SC3, or pressing of the button BTk of the guidance print explanation screen SC4, the multi function apparatus 100 transmits the specific information (specifically, the language information, the model information, and the region information) to the support server 200 (STEP S30 of FIG. 5 and FIG. 6A). Based on this information, the support server 200 determines the individual URL representing the location of the individual WEB page WPb to be accessed for the account registering procedure (STEP S34 of FIG. 5). Also, if the image processing server 300 receives the guidance image data request from the multi function apparatus 100 (STEP S38 of FIG. 5), the CPU 310 generates the guidance image data representing the guidance image GI including the code image QC representing the individual URL (STEP S40 of FIG. 5), and transmits the corresponding guidance image data to the multi function apparatus 100 (STEP S42 of FIG. 5). As a result, it is possible to make the multi function apparatus 100 print the guidance image GI. Therefore, the user can go through the account registering procedure including token acquisition by watching the printed guidance image GI. Therefore, it is possible to reduce a burden of the user for the cloud connection functions of using a WEB server by use of the multi function apparatus 100.

As can be understood from the above description, all of the support server 200 and the image processing server 300 are an example of a control server.

Since available WEB services can differ, individual WEB pages WPb to be accessed differ. In the present embodiment, an individual URL is determined based on model information and region information. As a result, it is possible to make the multi function apparatus 100 print a guidance image GI including an appropriate individual URL.

Guidance image data is generated by use of a template file which is determined based on language information which is transmitted from the multi function apparatus 100 to the support server 200 (STEPS S32 and S40 of FIG. 5). Guidance image data representing a guidance image GI including character strings represented by the corresponding language information is generated. As a result, it is possible to make the multi function apparatus 100 print a guidance image GI including appropriate character strings according to language information.

Further, each guidance image GI includes a URL which is represented by a code image QC and a URL which is represented by a character string TX (FIG. 7). As a result, the user can read the code image QC by use of a digital camera built in the terminal device 400, thereby accessing an individual WEB page WPb, and can input the character string TX to the terminal device 400, thereby accessing the top page WPa.

An individual URL which is represented by a code image QC is a location information item representing the location of a WEB page data item (that is, a WEB page data item representing an individual WEB page WPb) which is selected from a plurality of WEB page data items based on the specific information (for example, language information, model information, and region information). A common URL which is represented by a character string TX is a location information item representing the location of a WEB page data item representing a common WEB page regardless of the specific information (that is, a WEB page data item representing the top page WPa). As described above, a guidance image GI includes two location information items appropriate for the user. Therefore, it is possible to more appropriately reduce a burden of the user.

More specifically, a URL in a lower layer includes a larger amount of information (more characters), and thus it is more complicated to input the corresponding URL. In the above described embodiment, each individual URL is a URL in a layer lower than that of the common URL. As a result, as compared to a URL which is represented by a code image QC which the user does not need to input by hand, it is possible to reduce the number of characters of a URL which is represented by a character string TX which the user needs to input by hand. As a result, for example, like in a case of using a terminal device 400 which does not have a digital camera, in a case where the user needs to input a URL, it is possible to reduce a burden of the user for inputting the URL. Also, like in a case of using a terminal device 400 having a digital camera, in a case where the user does not need to input a URL by hand, it is possible to display an individual WEB page WPb according to language information, model information, and region information on the terminal device 400 from the beginning. As a result, it is possible to more appropriately reduce a burden of the user.

Some modifications to the above described embodiment will be described in below.

(1) In the above described embodiment, specific information for determining an individual URL includes model information, region information, and language information. However, the specific information may include service information representing a specific service selected through the service selection screen SC1, (FIG. 4) by the user, in place of or together with the model information, the region information, and the language information. In this case, an individual URL which is determined in STEP S34 of FIG. 5 may be determined based on the corresponding service information. For example, different individual WEB pages depending on a plurality of available WEB services are prepared. Thereafter, in STEP S34, the URL of an individual WEB page corresponding to a WEB service represented by service information is determined as an individual URL. In this case, for example, like "http://device.maker.com/?service=cloudservice", an individual URL may include service information (specifically, "?service=cloudservice1").

For example, there is a case where account registering procedures differ depending on services to be used. In this case, in the account registering procedures, WEB pages to be accessed can differ. For this reason, it is preferable to determine an individual URL based on service information like in the present modification. By doing this, it is possible to make the multi function apparatus 100 print a guidance image GI including a more appropriate individual URL, according to a WEB service to be used.

(2) The specific content of the process of FIGS. 4 and 5 in the above described embodiment is an example and can be appropriately changed. For example, as specific information for determining an individual URL of STEP S34 of FIG. 5, model information, region information, and language information are used. However, only model information may be used, or only region information may be used. Also, an individual URL in a guidance image GI may be displayed in a character string form, instead of a code image (QC) form.

(3) In place of the multi function apparatus 100 of the above described embodiment, a single printer which can perform a printing process but cannot perform a scanning process may be used. In this case, a guidance image of a procedure of registering an account information item AI for using a cloud connection function, for example, the "Download Print" function may be printed by the corresponding printer.

(4) In the above described embodiment, the support server 200 and the image processing server 300 are configured as individual apparatuses. However, the present disclosure is not limited thereto. For example, the support server 200 and the image processing server 300 may be configured as one control server.

(5) In each above described embodiment, some of components implemented by hardware may be replaced with software, and conversely, some or all of components implemented by software may be replaced with hardware.

Although the present disclosure has been described based on the embodiment and the modifications, the above described mode for carrying out the present disclosure is intended to facilitate the understanding of the present disclosure but does not limit the scope of the present disclosure. The present disclosure may include alterations, changes, and modifications of the embodiment without departing from the gist of the present disclosure and the scope of claims, and also includes equivalents thereof.

The present disclosure can be implemented in various forms besides the above described control server. For example, the present disclosure can be implemented in forms such as a system including a control server and an image processing apparatus, a guidance image printing method, computer programs for realizing that control server, that image processing apparatus, that system, or that method, and recording media with those computer programs.

What is claimed is:

1. A control server comprising:
a communication interface configured to be connectable with a network and establishes communication with an image processing apparatus through the network, the image processing apparatus being configured to perform one or more types of image processing including a printing process;
a processor; and
memory storing computer readable instructions that, when executed by the processor, causing the control server to perform:
receiving processing of receiving, through the communication interface, a guidance image data request and specific information, the guidance image data request being a request for guidance image data representing a guidance image of an acquiring procedure for acquiring authentication information required for receiving service provided by a service providing server connected to the image processing apparatus through the network;
location information determining processing of determining location information representing a location of data to be accessed in the acquiring procedure, based on the specific information;
image generating processing of generating the guidance image data representing the guidance image including the location information determined by the location information determining processing, when the guidance image data request is received; and
image transmitting processing of transmitting the guidance image data to the image processing apparatus through the communication interface.

2. The control server according to claim 1,
wherein the specific information includes at least one of model information representing the model of the image processing apparatus and region information representing a region, and
wherein the memory stores the computer readable instructions that, when executed by the processor, further causing the control server to perform:
in the location information determining processing, determining the location information based on at least one of the model information and the region information.

3. The control server according to claim 1,
wherein the specific information includes service information representing a specific service, and
wherein the memory stores the computer readable instructions that, when executed by the processor, further causing the control server to perform:
in the location information determining processing, determining the location information based on the service information.

4. The control server according to claim 1,
wherein the specific information includes language information representing type of language, and
wherein the memory stores the computer readable instructions that, when executed by the processor, further causing the control server to perform:
in the image generating processing, generating the guidance image data representing the guidance image including character strings determined based on the language information.

5. The control server according to claim 1,
wherein the location information, which is included in the guidance image, includes a first location information item which is represented by a code image, and a second location information item which is represented by characters.

6. The control server according to claim 5,
wherein the first location information item includes information representing the location of a specific first screen data which is selected from a plurality of first screen data based on the specific information, and
wherein the second location information item includes information representing the location of a second screen data representing a common screen through which enabling access to each of the plurality of first screen data, regardless of the specific information.

7. The control server according to claim 6,
wherein the memory is configured to store the plurality of first screen data and the second screen data, and
wherein the memory stores the computer readable instructions that, when executed by the processor, further causing the control server to perform:
in the image generating processing,
specifying a specific first screen data among the plurality of the first screen data stored in the memory, the specific first screen data corresponding to the specific information;
generating the first location information item including information representing the location of the specific first screen data in the memory; and
generating the guidance image data including the first location information item and the second location information item.

8. The control server according to claim 6,
wherein the location information, which is included in the guidance image, has a hierarchical structure, and
wherein the first location information item is information in a layer lower than that of the second location information item.

9. The control server according to claim 1,
wherein the location information, which is included in the guidance image, includes character strings related to the specific information.

10. The control server according to claim 1,
wherein the memory stores the computer readable instructions that, when executed by the processor, further causing the control server to perform:
receiving the guidance image data request from the image forming apparatus.

11. The control server according to claim 1,
wherein the memory stores the computer readable instructions that, when executed by the processor, further causing the control server to perform:
receiving the specific information from the image forming apparatus.

12. A non-transitory computer readable recording medium storing computer readable instructions for a control server that is provided with a communication interface and a processor, wherein the instructions, when executed by the processor, causing the control server to perform:

receiving processing of receiving, through the communication interface, a guidance image data request and specific information, the guidance image data request being a request for guidance image data representing a guidance image of an acquiring procedure for acquiring authentication information required for receiving service provided by a service providing server connected to the image processing apparatus through the network;

location information determining processing of determining location information representing a location of data to be accessed in the acquiring procedure, based on the specific information;

image generating processing of generating the guidance image data representing the guidance image including the location information determined by the location information determining processing, when the guidance image data request is received; and image transmitting processing of transmitting the guidance image data to the image processing apparatus through the communication interface.

* * * * *